G. E. WITHERELL, E. R. SEWARD & G. L. MASON.
VARIABLE SPEED MECHANISM.
APPLICATION FILED APR. 17, 1908.
972,138.
Patented Oct. 4, 1910.
5 SHEETS—SHEET 1.
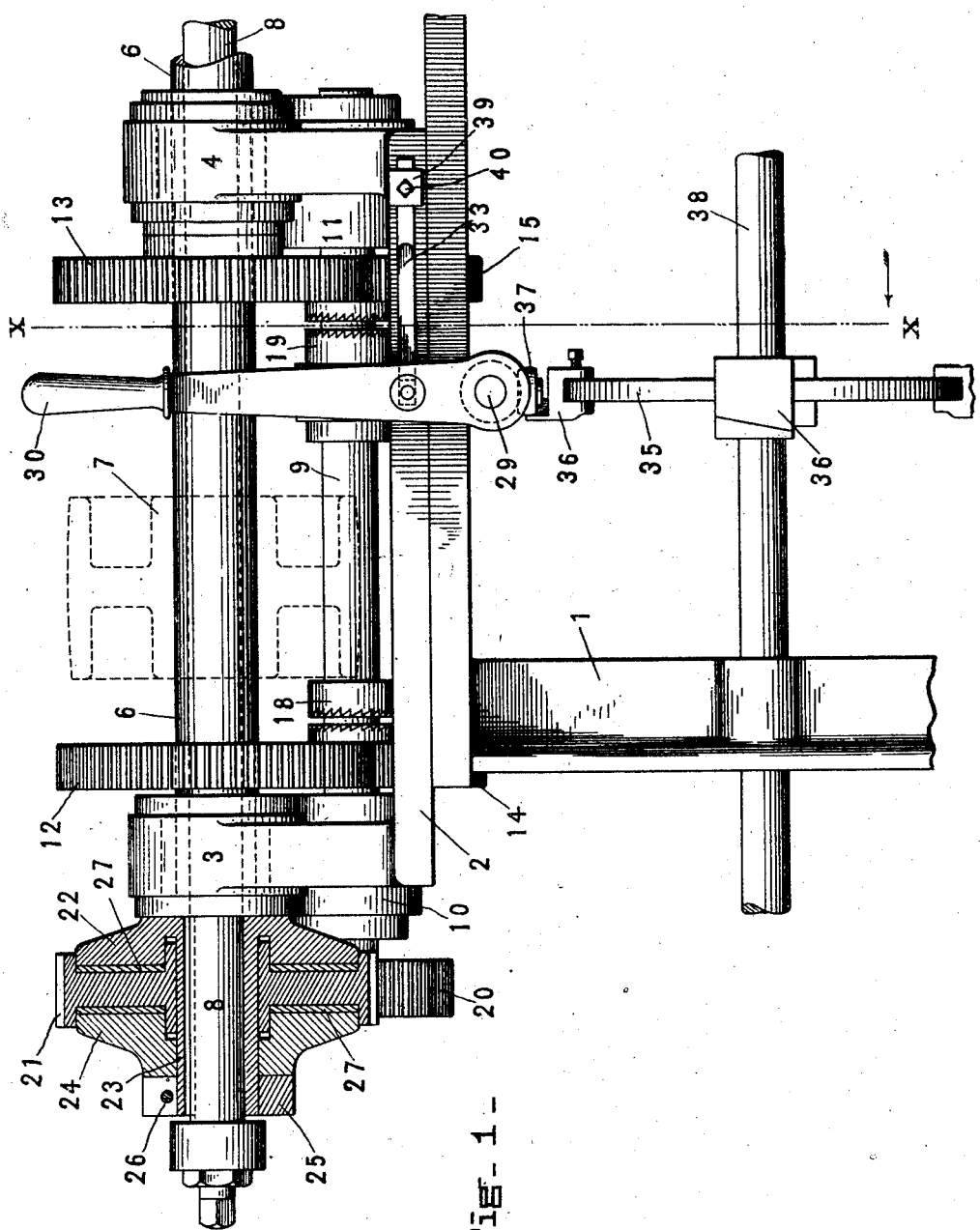
Fig-1-
WITNESSES
J Clyde Ripley
Alice M Parker
INVENTORS;
George E. Witherell,
Ernest R. Seward, &
George L. Mason.
BY
W. F. H. Barker
ATTORNEY G. E. WITHERELL, E. R. SEWARD & G. L. MASON.
VARIABLE SPEED MECHANISM.
APPLICATION FILED APR. 17, 1908.
972,138.
Patented Oct. 4, 1910.
5 SHEETS—SHEET 2.
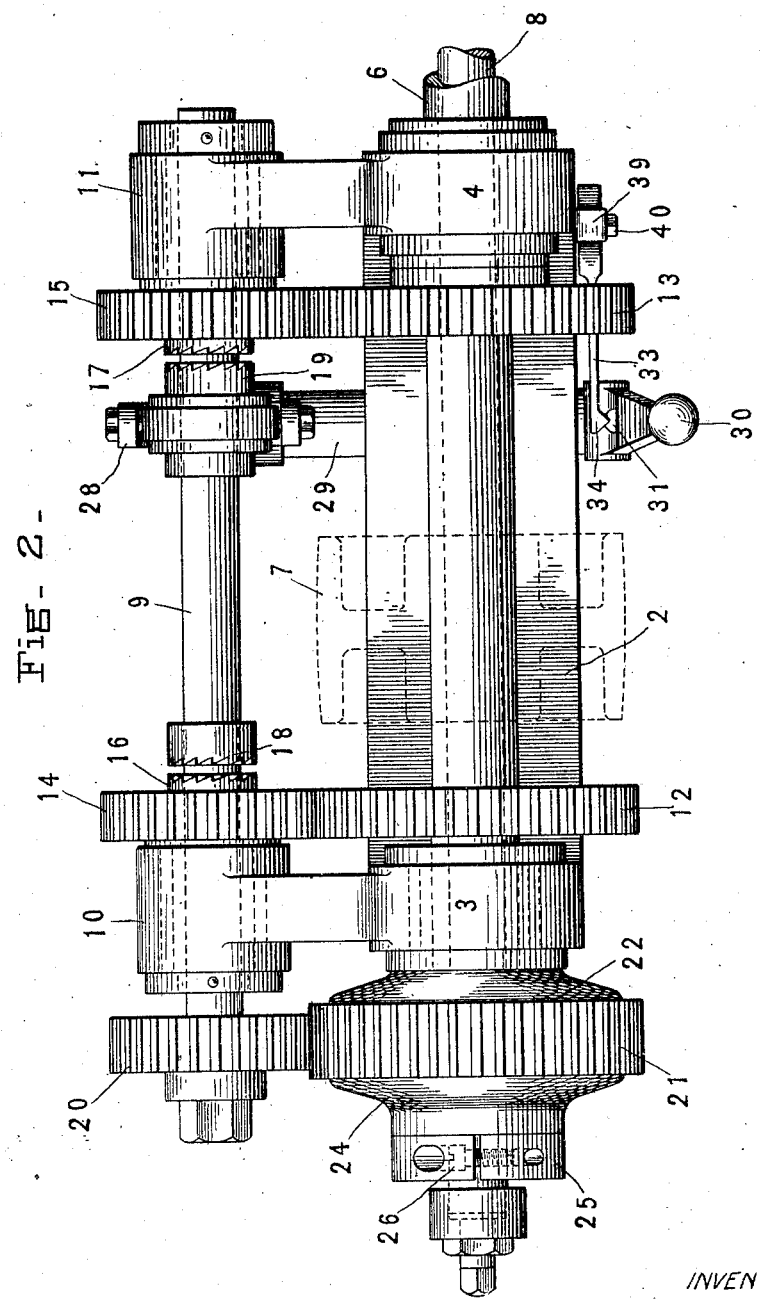
INVENTORS;
George E. Witherell,
Ernest R. Seward &
George L. Mason.
WITNESSES
ATTORNEY G. E. WITHERELL, E. R. SEWARD & G. L. MASON.
VARIABLE SPEED MECHANISM.
APPLICATION FILED APR. 17, 1908.
972,138.
Patented Oct. 4, 1910.
5 SHEETS—SHEET 3.
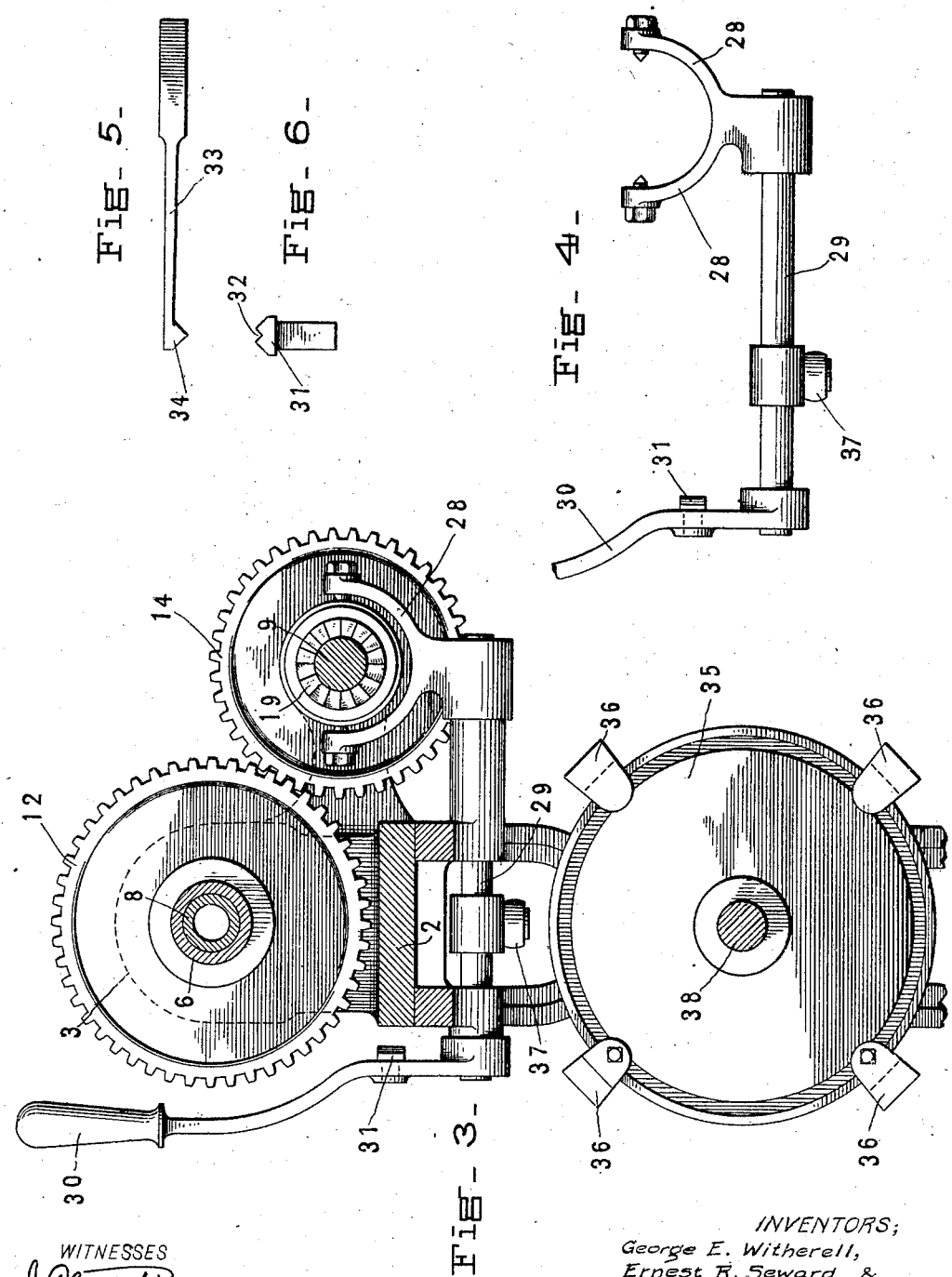
WITNESSES
INVENTORS;
George E. Witherell,
Ernest R. Seward &
George L. Mason.
BY
ATTORNEY

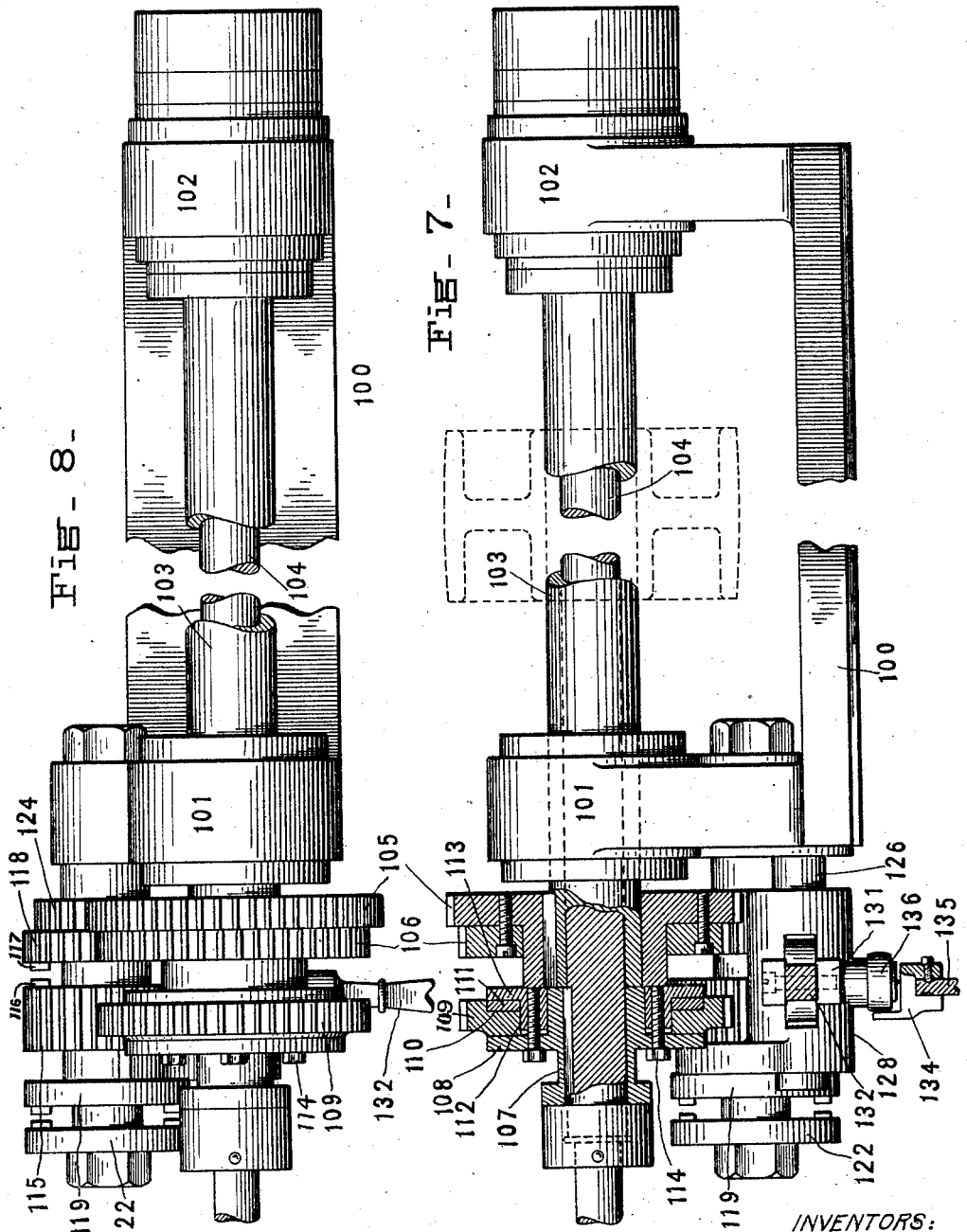

G. E. WITHERELL, E. R. SEWARD & G. L. MASON.
VARIABLE SPEED MECHANISM.
APPLICATION FILED APR. 17, 1908.
972,138.
Patented Oct. 4, 1910.
5 SHEETS—SHEET 5.
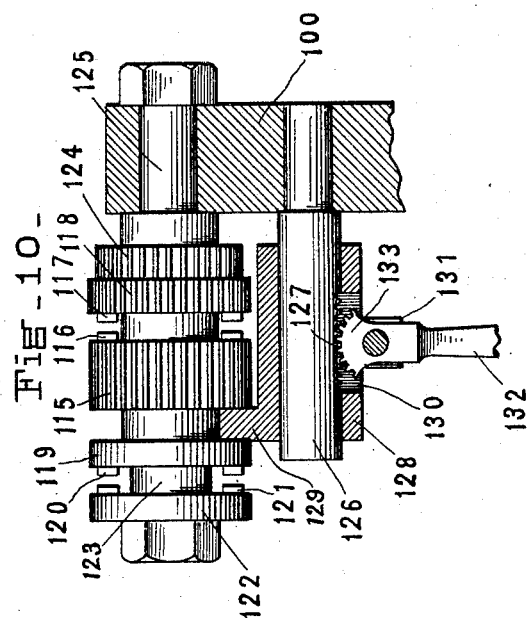
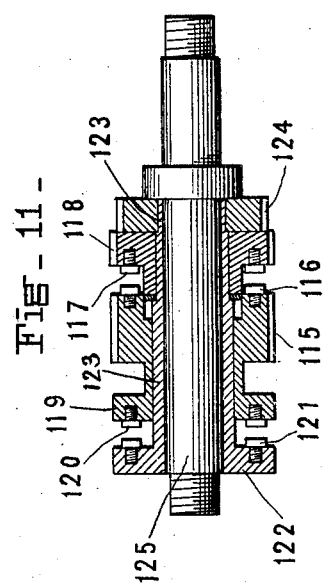
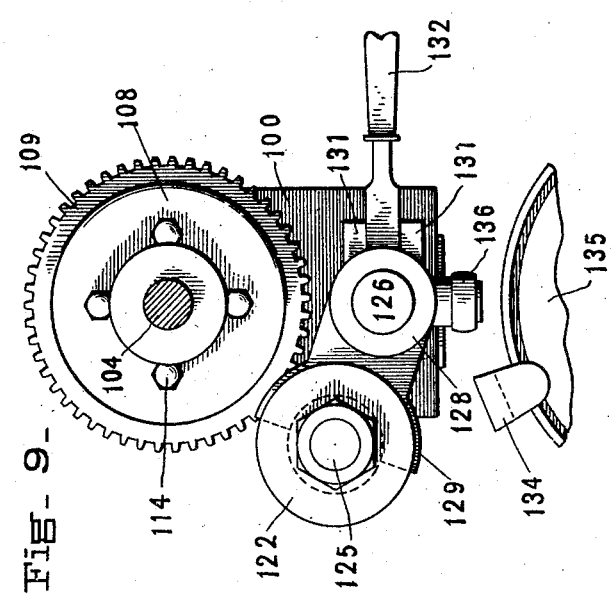
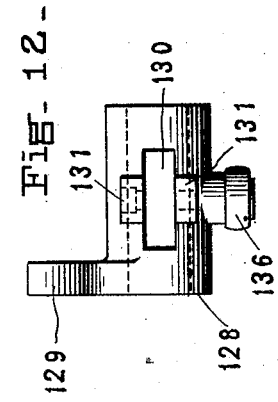
WITNESSES
INVENTORS
George E. Witherell,
Ernest R. Seward, &
George L. Mason.
BY
ATTORNEY

UNITED STATES PATENT OFFICE.

GEORGE E. WITHERELL AND ERNEST R. SEWARD, OF HARTFORD, AND GEORGE L. MASON, OF WAREHOUSE POINT, CONNECTICUT, ASSIGNORS TO THE HARTFORD MACHINE SCREW COMPANY, OF HARTFORD, CONNECTICUT, A CORPORATION OF CONNECTICUT.

VARIABLE-SPEED MECHANISM.

972,138.          Specification of Letters Patent.          Patented Oct. 4, 1910.

Application filed April 17, 1908. Serial No. 427,587.

*To all whom it may concern:*

Be it known that we, GEORGE E. WITHERELL and ERNEST R. SEWARD, both citizens of the United States, and residents of Hartford, in the county of Hartford and State of Connecticut, and GEORGE L. MASON, a citizen of the United States, and a resident of Warehouse Point, in the county of Hartford and State of Connecticut, have invented certain new and useful Improvements in Variable-Speed Mechanism for Metal-Working Machines, of which the following is a full, clear, and exact description, whereby any one skilled in the art may make and use the same.

The invention relates primarily to metal working machines, and more particularly to a variable speed mechanism for use in lathes, screw machines or like devices, and still more particularly to devices of this character having concentric spindles in which machines it is desirable or necessary to rotate such spindles at different speeds.

The object of the invention is to provide a spindle and operating mechanism therefor through the medium of which the outer and inner concentric spindles may be actuated at different speeds, although constantly rotating in the same direction.

A further object of the invention is to provide a means for frictionally controlling the concentric spindles in their rotating movements and to retard or accelerate the rotations of one of the spindles, while both are in course of rotation.

Referring to the drawings: Figure 1 is a view in side elevation of a machine embodying the improvement. Fig. 2 is a plan view of the parts shown in Fig. 1. Fig. 3 is a sectional view on the line X X of Fig. 1 looking toward the left of said figure. Fig. 4 is a detail view in elevation of the clutch yoke lever and shaft. Fig. 5 is a detail plan view of the spring stop forming part of the detent mechanism for the clutch lever. Fig. 6 is a plan view in detail of the clutch lever stud which coöperates with the spring shown in Fig. 5. Fig. 7 is a view in side elevation of a mechanism embodying a slightly modified form of the device shown in Figs. 1, 2 and 3. Fig. 8 is a plan view of the parts of the mechanism shown in modified form in Fig. 7. Fig. 9 is a view in end elevation of the parts shown in Figs. 7 and 8, illustrating the actuating cam. Fig. 10 is a detail view in plan with parts broken in section illustrating the clutch and gear mechanism shown in Figs. 7, 8 and 9. Fig. 11 is a detail sectional view of the clutches arranged upon the clutch stud illustrated in Fig. 10. Fig. 12 is a detail view in side elevation of the clutch yoke and slide illustrated in Figs. 7, 8, 9 and 10.

As shown in the accompanying drawings, the entire mechanism is mounted in a frame comprising a complete head of suitable form to be applied to the bed of any ordinary metal working machine. Of course it is obvious that the same elements herein shown and described might be re-arranged so that the whole structure would be inclosed within a casing and would form, comparatively speaking, one working unit of a machine.

Primarily, the device contemplates the utilization of positive driving and driven members so related and controlled that the driven members may be actuated at variable speeds from a main source of power and may be accelerated or retarded without liability of injury through cramping or breaking due to the positive driving elements.

In the accompanying drawings the numeral 1 denotes the bed or base of a metal working machine, upon which is suitably mounted an adjustable support 2 which corresponds in general form and arrangement to the head of an ordinary machine. This frame is provided with bearing heads 3—4 forming suitable bearings for a pair of concentric spindles 6 and 8.

The outer spindle 6, which is directly driven by any suitable means as a pulley 7, indicated in dotted outlines in Figs. 1 and 2, is of tubular form and forms a bearing for an inner spindle 8.

Arranged in parallel relation to concentric spindles 6 and 8, is a counter-shaft 9 suitably mounted in the bearings 10—11 shown herein as extended from the main spindle bearings 3—4 and bearing gears which mesh with the gears upon the outer spindle 6. The outer spindle 6 has secured to it two gears 12—13 meshing with corresponding gears 14—15, the latter two gears loosely mounted with reference to the counter-shaft 9. The gear 12 has a greater number of teeth than the gear 13, and of course the gears 14—15 of the counter-shaft 9 have the required number of teeth to properly mesh with them. The gears 14—15 of the counter-shaft are provided respectively with clutch members 16—17 by which they may be secured to uniformly rotate with the counter-shaft 9 by coöperating clutch members 18—19 fast upon the shaft 9. The shaft 9 has a sufficient axial movement to give the required clutching action with respect to its clutch members 18—19 and the clutch members 16—17 of the gears 14—15, it being understood that the clutches may both occupy a position of disengagement or that either clutch may be engaged with the corresponding gear clutch.

At the outer end of the shaft 9 is a gear 20 which meshes with a comparatively wide faced gear 21, arranged to effect a frictional drive between the outer and inner spindles 6 and 8. The gear 21 is of wide face so that the shifting movement of the shaft 9 with its gear 20 will always maintain a proper mesh between the gears 20 and 21. The gear 20 has a smaller number of teeth than the gear 15 and a larger number of teeth than the gear 14, and of course it is understood that there are variations in the number of teeth of the gear 21 as compared with the gears 12—13.

Upon the outer end of the inner spindle 8 is a disk-like member 22 having an extended or elongated hub 23, upon which the gear 21 is loosely mounted except for the friction device hereinafter described. The disk-like member 22 is keyed or secured to the inner spindle 8, while on the opposite side of the gear 21 is a similar disk-like member 24 which is also mounted upon the extended hub 23 of the disk 22. This disk 24 is backed up by an adjusting collar 25 and may be locked in any desired position axially of the extended hub 23 by a binding screw 26. As shown the collar 25 is split so that it may be clamped at any desired position on the hub 23. By its adjustment the distance between the disks 22 and 24 may be varied and said disks may thus exert a greater or less pressure upon the gear 21. Intermediate the opposing faces of the disks 22 and 24 and the body portion of the gear 21 are arranged friction disks 27 which may be made of any suitable material, as for instance,— leather or fiber,—and which are clamped between the disks 22 and 24 and the body portion of the gear 21 to effect a greater or less cohesive effect according to the adjustment secured through the collar 25. It will thus be observed that the gear 21 is frictionally bound to the inner spindle 8, and while it will cause the rotation of said spindle section when rotated by the coöperating gear 20, it will only rotate said spindle positively until a certain resistance may be applied to retard its rotating action, as for instance—by holding or retarding the spindle 8.

The counter-shaft 9 and the clutch sections 18—19 are moved into and out of engagement with their corresponding clutch members by a yoke 28 secured to a shaft 29 which is suitably arranged in the frame 1 of the machine and is provided at its outer end with an operating handle or lever 30. This handle has secured in it a stud 31 provided with a V-shaped notch 32 which coöperates with a detent spring 33 having a wedge-shaped lock 34 adapted to engage and hold the block of the lever 30 in its normal position with both of the clutches 18—19 out of engagement. As the handle 30 is shifted in either one or the other direction the clutch members 18 and 19 will be made to engage with the corresponding clutch members 16—17 upon the gears 14—15, and thus either one of the sets or couplets of gears will be connected up with the main driving mechanism of the spindles and will thus be rotated. Whenever the shaft 9 is driven by either of the gears 14 or 15 through the engagement of their respective clutches, the gear 20 will be rotated and will transmit its movements derived from the shaft 9 to the gear 21 and the inner spindle 8.

In ordinary practice of the invention the gear 20 has one more tooth than the gear 14 and one less tooth than the gear 15; thus, when the gear 14 is clutched to its shaft the gear 21 and the inner spindle 8 will be rotated at a slightly greater speed than the speed of the outer spindle 6, giving a moderate difference of rotation between the two spindles, although both rotated in the same direction. In like manner if the clutch 19 is thrown into engagement with the corresponding gear clutch 17, the inner spindle 8 through the gears 20 and 21 will be revolved at a slightly less speed than the outer spindle 6. It is thus apparent that the rotation of the inner spindle may be accelerated or retarded with reference to the rotations of the outer spindle with both parts rotating in the same direction.

The gear 21 is held to the inner spindle 8 through the frictional means heretofore described consisting of the disks 22—24 and washers 27, and as this frictional grip is made adjustable, it follows that the height of pressure and driving effect of the inner spindle 8 will be determined by the resistance exerted upon the spindle 8 in comparison to the frictional contact exerted by the disks 22—24. When the resistance on the spindle 8 overcomes the driving force exerted by the friction disks 22—24 the gear 21 will slip and thus prevent fracture of the parts provided the resistance on the spindle 8 was sufficient to cause breakage.

One of the objects of providing the different rotary movements between the inner and outer spindles, while having them both rotated continuously and in the same direction, is to provide for the use of tools where a different speed or a uniform speed is required at alternate intervals, it is therefore essential to provide a resilient drive between the spindles to prevent breakage of the tools when the parts are placed under increased strain. For instance, the operating lever 30, when thrown into one of its clutching positions, might be held for too long a period and unless the slip or friction device were employed there would be liability of damaging the tools or work.

Hereinabove there has been described an operating handle 30 for effecting different rotary movements of the spindles. There has also been shown in Figs. 1 and 3 of the drawings an automatic means for actuating the clutches 18—19. This automatic means consists of a cam disk 35, bearing cams 36 suitably placed and timed to oscillate the shaft 29 and its yoke 28 through the medium of a roll 37 secured to said shaft 29 and arranged in the path of movement of the cam. Of course the cam disk 35 with its cam is rotated at a suitable speed by the shaft 38 which may be driven in any desired manner and in proper time relation to the other working parts. The spring detent 33 which normally holds the operating lever 30 is, for convenience, suitably mounted in a block 39 where it is secured by a set screw 40.

While the above description has been confined to the form of invention shown in Figs. 1 to 6 inclusive, a modified form of the device is illustrated in Figs. 7 to 12 inclusive. In the form of device herein shown all of the several gear mechanisms, clutch mechanisms and operating parts are located at one end of the head of the machine and constitute practically an attachment applied to and overhanging the end of the movable support. The principle of operation and the general elements of the device are substantially the same as heretofore described, both in principle and mode of operation. In these figures, the numeral 100 denotes a support having bearing sections 101—102, in which is supported an outer spindle 103 and an inner concentric spindle 104. The outer spindle has mounted upon it and secured thereto a pair of gears 105—106, the former having a greater number of teeth than the latter. Secured to the inner spindle which projects through these gears 105—106 is a sleeve 107, having upon one face a disk 108 against which rests the body part of a gear 109. This gear is cut away on the opposite side as at 110 to form a recess within which a friction washer 111 may be arranged. The gear is supported upon a sleeve 112 having a flange 113 resting against the friction washer and coöperating with the flange or disk 108 to exert the desired resistance or frictional pressure upon the sides of the gear 109.

Adjusting screws 114 extending through the disk 108 and into the sleeve 112 determine the amount of pressure exerted by the disks upon the gear. This gear 109 meshes with a gear 115 which has upon one side a disk bearing pins 116 forming a clutch member to coöperate with pins 117 arranged upon the opposing face of the gear 118, which latter gear meshes with the gear 106. On the opposite side of the gear 115 is a pin clutch disk 119 having pins 120 which coöperate with pins 121 of a clutch disk 122. The clutch disk 119 is secured to or formed integrally with the gear 115, while the clutch disk 122 is formed upon a sleeve 123 which has secured to it at its opposite end the gear 124, which gear meshes with the gear 105. All of the several gears adjacent to the gear 115 and its clutch members are mounted upon a fixed stud 125 directly secured in the supporting frame 100. Operatively arranged with relation to said stud is a second stud 126 which has formed on one face a rack 127 and supports a clutch shifting sleeve 128 which has a yoke 129 that fits within a recess formed between the clutch disk 119 and the gear 115. This clutch shifting sleeve has an opening 130 and lugs 131, between which there is pivotally supported an operating handle 132 bearing on its inner end a segmental rack 133 which meshes with the rack upon the stud 126. As the handle 132 is moved it is apparent that the gear 115 and its clutch members will be moved into engagement either with the clutch member of the gear 118 or the clutch member of the gear 124, in the latter instance through the medium of the sleeve 123, clutch disk 122 and clutch pins 121 and 120.

The gear 124 having a less number of teeth than the gear 118 and the gear 115 having a greater number of teeth than one of the gears and a less number of teeth than the other gear, produces, when driving through the gear 109, a different rotary movement between the inner spindle 104 and the outer spindle 103. Obviously, the movement of the clutch members and their engagement and disengagement either retards or accelerates one spindle with reference to the other dependent upon the clutch which is in engagement.

The friction device heretofore referred to in connection with the gear 109 of this modified form of device operates in exactly the same manner and for the same purpose and effects the same results as the friction device described in connection with the preferred form, and whenever the resistance to one spindle is sufficient, the gear 109 will slip, thus preventing breakage. In this modified form of the device the parts may be automatically actuated by a cam or series of cams 134 mounted upon a suitable cam disk 135 and acting upon a roll 136, carried upon a stud secured to the clutch sleeve 128.

In case cams are used to automatically control the shifting of the clutches and the corresponding different rotary movements of the spindle, the arrangement of said cams may be such as to accelerate or retard the relative rotations of the spindles for predetermined periods, and to permit them to run in unison for predetermined periods. For instance, there must be one cam for throwing the parts out of normal position for accelerating the movement of the inner spindle, and another cam for throwing the parts back to normal position when said spindle has been accelerated for the required period of time. Two cams must likewise be used for throwing the parts from normal position to accelerate the movement of the outer spindle and insuring the returning of said parts to normal position when said outer spindle has been accelerated for the required period.

Obviously, various changes as to details might be made in the device hereinabove shown and described without departing from the spirit or intent of the invention. In fact, numerous constructions might be devised and used without departing from the invention so long as the different rotary movement is effected between the two spindles, whereby one or the other may be accelerated either by hand manipulation or automatically and without necessitating the stopping of the spindle or a change of directional rotation while running.

What I claim as my invention and desire to secure by Letters Patent is:

1. In combination with a support, concentric spindles mounted to rotate therein, gears mounted upon the outer spindle, intermeshing gears operatively mounted with respect to the gears upon said outer spindle, a gear mounted upon the inner spindle, an intermeshing gear operatively mounted to mesh therewith and clutch devices for operatively connecting either one or the other of the intermeshing gears of the outer spindle with the intermeshing gear of the inner spindle whereby a difference in rotation is effected between the inner and outer spindles.

2. In combination with a support, concentric spindles mounted to rotate therein, gears mounted upon the outer spindle, gears intermeshing respectively with the gears of the outer spindle, intermeshing gears intermediate the inner spindle and the intermediate gears of the outer spindle, and clutch devices for operatively connecting either one or the other of the sets of intermeshing gears of the outer spindle with the intermeshing gears of the inner spindle, whereby a difference in rotation is effected between the inner and outer spindles.

3. In combination with a support, a spindle mounted to rotate therein, a pair of gears mounted upon said spindle, a second spindle member concentrically arranged within the first named, outer spindle, a gear carried by the inner spindle, a pair of loosely mounted gears meshing respectively with the gears on the outer spindle, a gear meshing with the gear upon the inner spindle, and clutch devices interposed between the first named pair of gears and the gear upon the inner spindle.

4. In combination with a support, concentric spindles mounted therein, a gear operatively mounted with respect to the inner spindle, a friction disk secured to said inner spindle and bearing against the gear, a coöperating friction disk operatively arranged to exert a clamping action upon the gear with respect to the first named disk, a gear meshing with the gear of the inner spindle, gears mounted upon the outer spindle, gears intermeshing with the respective gears of the outer spindle and clutch devices for operatively connecting either of the sets of intermeshing gears of the outer spindle with the intermeshing gears of the inner spindle.

5. In combination with a support, concentric spindles mounted to rotate therein, a gear frictionally held to one of said spindles and connections intermediate said gear and the other spindle for transmitting to it a movement of either greater or less speed than the speed of the first named spindle.

6. In combination with a support, concentric spindles mounted to rotate therein, a gear frictionally held in connection with one of the said spindles, a plurality of sets of intermeshing gears connected with the other one of the concentric spindles and connected with the said frictional gear, and clutch devices coöperating with said gears for controlling the relative difference of rotation of the spindles.

7. In combination with a support, concentric spindles mounted to rotate therein, said spindles rotatable relatively to each other and automatic means for controlling the difference of rotation of the spindles.

8. In combination with a support, concentric spindles mounted to rotate therein, said spindles being rotatable relatively to each other, a pair of gears secured to the outer spindle, a gear mounted upon the inner spindle, a stud projecting from the support, a pair of gears mounted to rotate on said stud and meshing with the gears on the outer spindle, a gear intermeshing with the gear of the inner spindle and clutch mechanism for operatively connecting either of the pairs of gears of the outer spindle with the intermeshing gear of the inner spindle.

9. In combination with a support, concentric spindles mounted to rotate therein, said spindles being rotatable relatively to each other, a pair of gears secured to the outer spindle, a gear frictionally mounted upon the inner spindle, a stud projecting from the support, a pair of gears mounted to rotate on said stud and meshing with the gears on the outer spindle, a gear meshing with the gear of the inner spindle and clutch mechanism for operatively connecting either of the pairs of gears of the outer spindle with the intermeshing gears of the inner spindle.

10. In combination with a support, concentric spindles mounted to rotate therein, the said spindles being rotatable relatively to each other, a pair of gears mounted side by side on one of the spindles, a single gear borne by the other spindle, a stud secured to the frame, a clutch member having a sleeve surrounding the said stud, a gear fast upon the sleeve engaging with one of the said pair of gears secured to one of the spindles, a clutch member and gear loosely mounted upon the sleeve, this gear engaging the other of the said pair of gears, a gear and clutch members loosely mounted on the sleeve, this gear meshing with the said single gear on the other spindle, and its set of clutch members being arranged to engage respectively with the already mentioned set of clutch members, one of the sets of clutch members being adjustable, and means for actuating the adjustable set of clutches.

11. In combination with a support, concentric spindles mounted to rotate therein, the said spindles being rotatable relatively to each other, a pair of gears mounted side by side on one of the spindles, a single gear borne by the other spindle, a stud secured to the frame, a clutch member having a sleeve surrounding the said stud, a gear fast upon the sleeve engaging with one of said pair of gears secured to one of the spindles, a clutch member and gear loosely mounted upon the sleeve, this gear engaging the other of the said pair of gears, a gear and clutch members loosely mounted on the sleeve, this gear meshing with the said single gear on the other spindle, and the clutch members arranged to engage respectively with the already mentioned clutch members, one of the sets of clutch members being adjustable, and automatic means for actuating the adjustable set of clutches to cause one or the other of the said pair of gears to be connected with the said single gear.

GEORGE E. WITHERELL.
ERNEST R. SEWARD.
GEORGE L. MASON.

Witnesses:
JOSEPH F. COOLEY,
SAMUEL H. CURTISS.